Jan. 26, 1954   P. KLAMP   2,667,050
OVERLOAD PROTECTOR

Filed Oct. 30, 1950   2 Sheets-Sheet 1

*INVENTOR.*
PAUL KLAMP
BY
ATTORNEYS

Jan. 26, 1954  P. KLAMP  2,667,050
OVERLOAD PROTECTOR
Filed Oct. 30, 1950  2 Sheets-Sheet 2
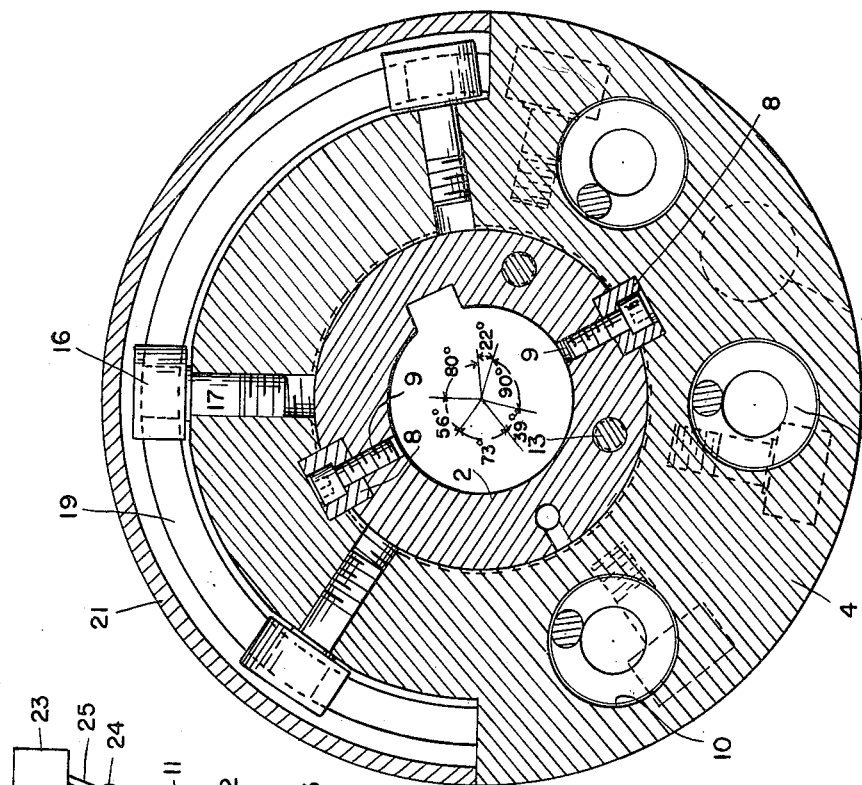
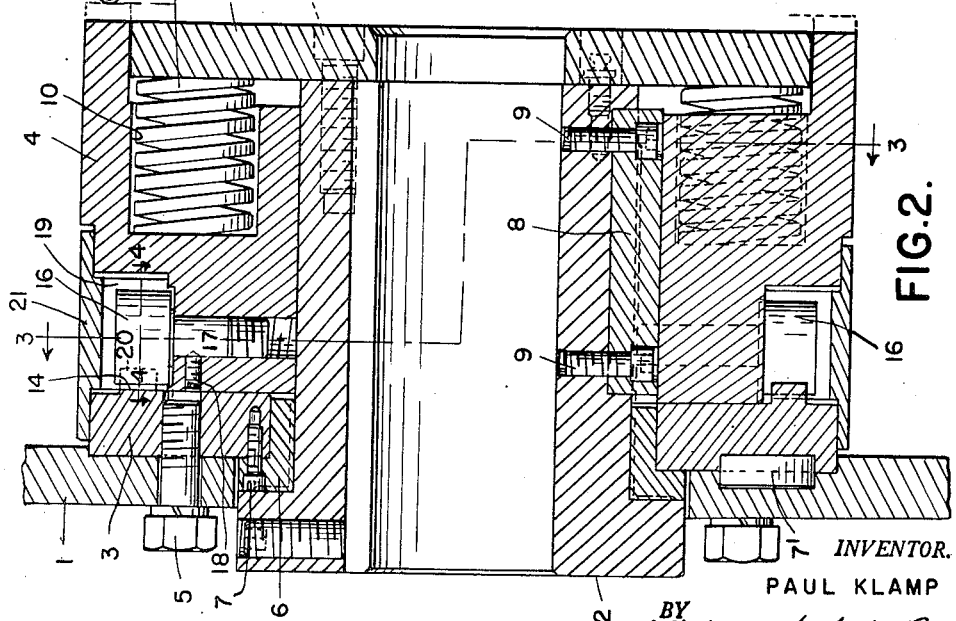
INVENTOR.
PAUL KLAMP
BY
ATTORNEYS Patented Jan. 26, 1954

2,667,050

UNITED STATES PATENT OFFICE 2,667,050

OVERLOAD PROTECTOR

Paul Klamp, Detroit, Mich., assignor to Mechanical Handling Systems, Inc., Detroit, Mich., a corporation of Michigan Application October 30, 1950, Serial No. 192,893

1 Claim. (Cl. 64—29)

The invention relates to overload protectors and refers more particularly to devices for coupling relatively low speed power drive and driven parts in a manner such that they will become automatically disconnected when the driven part is subjected to an overload.

The invention has for one of its objects to provide an improved construction of overload protector in which the clutch members are limited in their movement toward each other independently of the cooperating coupling elements carried by the clutch members.

The invention has for another of its objects to provide an improved construction of overload protector in which the clutch members are held separated against the action of spring means in all positions of relative rotation except the operative or coupled position by multiple coupling elements at different points around the axes of the clutch members providing at least a three point support with the axes of the clutch members enclosed within the space confined by the lines connecting the supporting coupling elements.

With these as well as other objects in view, the invention resides in the novel features of construction and combinations and arrangements of parts as more fully hereinafter set forth:

In the drawings:

Figure 2 is a cross section on the line 2—2 of Figure 1;

Figure 1:
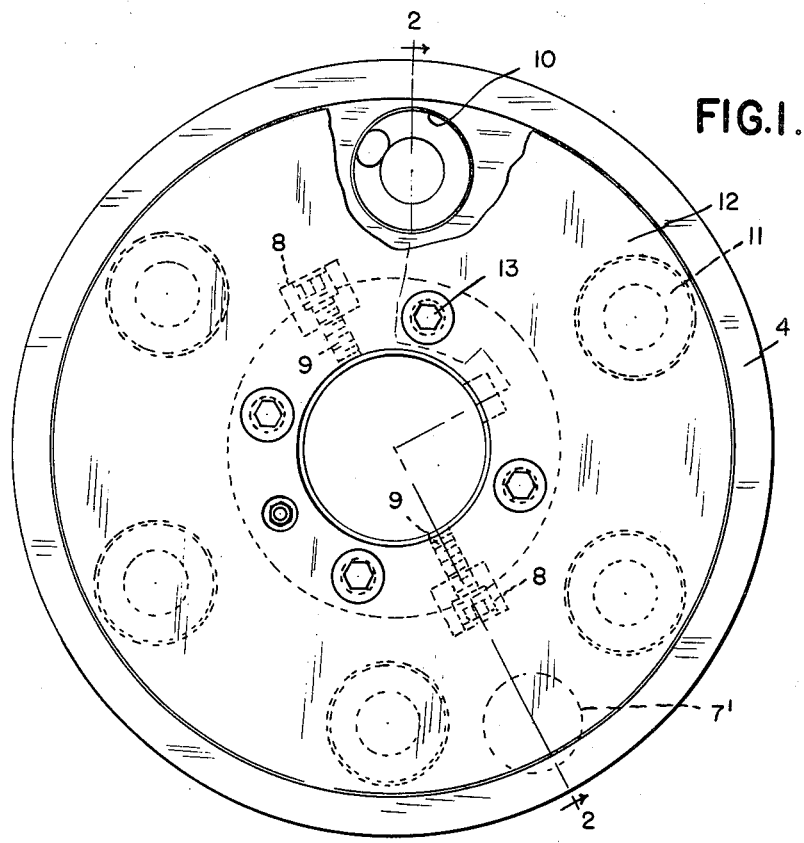
Figure 1 is an end view of an overload protector embodying the invention.
Figure 4:
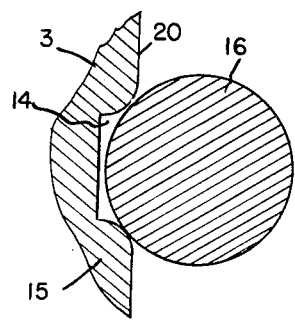

Figures 3 and 4 are cross sections on the lines 3—3 and 4—4 respectively of Figure 2.

As illustrated in the drawings the overload protector is designed particularly for use in coupling relatively low speed power drive and driven parts and comprises the rotatable drive and driven members 1 and 2 and the rotatable clutch members 3 and 4. In the present instance, the drive member 1 is a steel plate sprocket adapted to be connected to a suitable prime mover by means of a chain and the driven member 2 is a hub adapted to be keyed to a shaft. The clutch member 3 is a ring rotatable with the sprocket 1. The ring is secured to the sprocket in concentric relation thereto by the bolts 5 and is secured to the bushing 6 in concentric relation thereto by the bolts 7, the bushing being concentric with and sleeved over and journaled on the hub and abutting an end flange of the hub. The ring is driven by the drive button 7'. The clutch member 4 is a cylindrical roller carrier sleeved over and rotatable with the hub in concentric relation thereto. The carrier is keyed to the hub by the diametrically opposite keys 8 extending longitudinally of the hub and carrier and secured to the hub by the bolts 9. The carrier 4 is formed with the bores 10 extending longitudinally from the outer end of the carrier and angularly spaced at equal angles from each other about the axes of the hub and carrier. 11 are coil springs abutting the ends of these bores and the pressure plate 12 which extends within the outer end of the carrier and is secured to the hub by the bolts 13. These springs are under compression and urge the carrier longitudinally toward and into abutment with the ring.

The clutch members 3 and 4 are provided with cooperating coupling elements for normally coupling the clutch members and as a result the drive and driven members to each other. The coupling elements of the clutch member or ring 3 are formed by the radially extending U-shaped recesses or grooves 14 in the annular band 15 concentric and integral with the ring and located radially outwardly beyond the abutment faces of the ring and carrier. The recesses or grooves are symmetrical with respect to their radial median planes so that the overload protector is reversible. The coupling elements of the clutch member or carrier 4 are formed by the rollers 16 journalled on the pins 17 extending radially into the carrier 4 and secured thereto by means of the set screws 18. The rollers are arranged in an annular series concentric with the carrier and are located in the annular rabbet 19 of the carrier in position to extend into the recesses and ride over the coplanar lands 20 extending between the recesses. 21 is the closure band sleeved over the ring and carrier 3 and 4 radially outwardly of the rollers. The recesses are in multiple unevenly spaced pairs of unevenly spaced adjacent recesses and the rollers are correspondingly spaced. In the present instance the angular spacing in a clockwise direction between pairs of recesses is substantially 90°, 73°, and 80° and the angular spacing in a clockwise direction between the recesses of the pairs is substantially 22°, 39° and 56°. Or, the angular spacing in a clockwise direction between adjacent recesses is substantially 22°, 90°, 39°, 73°, 56° and 80°. The rollers are correspondingly spaced. The recesses are all alike as are the rollers and the width of each recess between its driving points of contact of side walls is greater than the length of chord of each roller extending between and aligned with the points, the abutting faces of the clutch members 3 and 4 limiting the movement of the clutch member 4 relative to the clutch member 3 to hold each roller out of contact with the bottom and one side wall of its respective recess. The outer edges of the side walls of the recesses are curved to merge gradually into the lands 20 so that a progressively decreasing resistance is offered to the movement of the rollers from the recesses to the lands in the event of an overload on the hub member 2. At the same time these curved surfaces provide for gradual entrance of the rollers into the recesses. It will be noted that the coil springs 11 control the amount of overload to which the hub member 2 is subjected before the sprocket rotates relative to the hub member to disengage its coupling recesses from the coupling rollers.

By reason of the above construction, the rollers in the operative or coupling position of relative rotation of the clutch members have portions projecting into the recesses to effect the coupling of the clutch members and consequently the drive and driven members. However, in all other positions of relative rotation of the clutch members, they are held separated against the pressure exerted by the springs by at least one roller of each pair riding over lands between the recesses and constituting multiple supporting rollers at different points around the axes of the clutch members with the axes of the clutch members enclosed by the space confined by the lines connecting the supporting rollers. In other words, in all other positions of relative rotation of the clutch members, they are held separated by supporting rollers providing at least a three point support with the axes of the clutch members within the space formed by lines connecting the supporting rollers. As a result the pressure exerted by the springs is distributed in a manner to avoid binding between the clutch member carrying the springs and the hub over which the clutch member is longitudinally movable. Also, by providing the clutch members with abutting faces holding each roller from engaging the bottom and one side wall of its recess, the rollers are not subjected to impact when re-entering the recesses during the resetting of the overload protector.

For the purpose of stopping the prime mover connected to the sprocket after the coupling elements have become disengaged a suitable limit switch 23 is provided beyond the outer end of the clutch member 4 and having the roller 24 upon its lever 25 located to be engaged by the portion of the outer end of the clutch member beyond the pressure plate 12.

What I claim as my invention is:

An overload protector comprising substantially coaxial rotatable members supported for axial and rotative movement relative to each other, spring means for yieldably urging said members toward each other, one of the members having at least six recesses extending radially with respect to the axes of the members, the angular spacing of any adjacent pair of said recesses differing from the angular spacing of any other adjacent pair of said recesses, a series of elements on the other member, said elements corresponding in number to the number of recesses and being angularly spaced in accordance with the spacing of said recesses whereby all of said elements engage with said recesses when said members are in a single relative position, the aforesaid angular spacing of the recesses and elements being such that when said members are in any relative rotative position other than said single position at least three of said elements are out of registration with any of said recesses and the lines connecting said three elements form a triangle in which said axes are enclosed.

PAUL KLAMP.

References Cited in the file of this patent

UNITED STATES PATENTS

| Number | Name | Date |
|---|---|---|
| 1,479,706 | Fleischer | Jan. 1, 1924 |
| 2,127,855 | Baumgratz et al. | Aug. 23, 1938 |
| 2,145,083 | Dynes | Jan. 24, 1939 |
| 2,292,759 | Johnson | Aug. 11, 1942 |
| 2,443,213 | Weber | June 15, 1948 |